United States Patent
Au et al.

(10) Patent No.: US 7,646,922 B2
(45) Date of Patent: Jan. 12, 2010

(54) OBJECT CLASSIFICATION IN VIDEO IMAGES

(75) Inventors: Kwong Wing Au, Bloomington, MN (US); Saad J. Bedros, West St. Paul, MN (US); Keith L. Curtner, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 681 days.

(21) Appl. No.: 11/323,826

(22) Filed: Dec. 30, 2005

(65) Prior Publication Data

US 2007/0154100 A1 Jul. 5, 2007

(51) Int. Cl.
*G06K 9/68* (2006.01)
*G06K 9/46* (2006.01)
*G06K 9/00* (2006.01)

(52) U.S. Cl. .................................. 382/226; 382/190

(58) Field of Classification Search ................ 382/103, 382/107, 156, 159, 162, 164, 165, 167, 173, 382/181, 190, 195, 199, 224, 225, 226, 236; 345/589, 600–604; 358/515, 518, 520, 523, 358/525, 530; 348/699, E5.066, E7.106; 375/240.02, 240.12, 240.13, 240.16
See application file for complete search history.

(56) References Cited

U.S. PATENT DOCUMENTS

| | | | | |
|---|---|---|---|---|
| 5,144,426 | A * | 9/1992 | Tanaka et al. | 375/240.13 |
| 5,387,947 | A * | 2/1995 | Shin | 348/699 |
| 5,796,871 | A * | 8/1998 | Kawamura et al. | 382/236 |
| 6,026,182 | A * | 2/2000 | Lee et al. | 382/173 |
| 6,642,940 | B1 * | 11/2003 | Dakss et al. | 715/723 |
| 2001/0043653 | A1 * | 11/2001 | Hosaka | 375/240.16 |
| 2002/0085740 | A1 * | 7/2002 | Asano et al. | 382/107 |
| 2003/0099395 | A1 * | 5/2003 | Wang et al. | 382/165 |
| 2003/0108100 | A1 * | 6/2003 | Sekiguchi et al. | 375/240.02 |
| 2003/0215145 | A1 * | 11/2003 | Shilman et al. | 382/195 |
| 2005/0265448 | A1 * | 12/2005 | Nozawa | 375/240.12 |
| 2007/0154100 | A1 * | 7/2007 | Au et al. | 382/226 |

* cited by examiner

*Primary Examiner*—Amir Alavi
(74) *Attorney, Agent, or Firm*—Kris T. Fredrick

(57) ABSTRACT

A combination of inter-frame and intra-frame and sequential classification methods provide for robust and flexible object classification. Intra-frame classification determines the object type based on features extracted from a single image. Inter-frame classification determines object types based on the features extracted from several sequential frames. A sequential classification combines the results of the inter- and intra-frame classifications over a sequence of images.

16 Claims, 13 Drawing Sheets

| NO. | REFERENCE NAME | TYPE | DEFINITION |
|---|---|---|---|
| 1 | Camera ID | Int | The camera identification tag which the segmented object is obtained. |
| 2 | Frame ID | Int | The frame number or time refernce which the segment is obtained |
| 3 | Segment ID | Int | The segment identification tag of the segment in the image frame. |
| 4 | Track ID | Int | The track identification tag which the segment belongs to. |
| 5 | Segment Perimeter | float[i] | No. of pixel around the border of the segmented object |
| 6 | Segment Area | float[j] | Total number of pixels of the segmented object |
| 7 | MBR Area | float[k] | Total number of pixels of the Minimum Boundary Rectangle (MBR) |
| 8 | MBR Length | float[l] | No. of pixels of the MBR along the horizontal direction. |
| 9 | MBR Width | float[m] | No. of pixels of the MBR along the vertical direction. |
| 10 | x Centroid Difference | float[n] | The difference in no, of pixels between the centroid of the segmented object and the MBR along the horzontal direction |
| 11 | y Centroid difference | float[p] | The difference in no, of pixels between the centroid of the segmented object and the MBR along the vertical direction |
| 12 | Centroid varaince | float[q] | The sum of the squares of the x Centroid Diffference and the y Centroid Difference. This is the square distance between the two centroids. |
| 13 | Compactness | float[r] | (Segment Perimeter)$^2$/ Segment Area |

*FIG. 2A*

| NO. | REFERENCE NAME | TYPE | DEFINITION |
|---|---|---|---|
| 14 | Fill ratio | float[s] | Segment Area / MBR Area |
| 15 | LW ratio | float[t] | MBR Length / MBR Width |
| 16 | Segment Silhouette | ImStruct | A rectangular image structure that contains the segment silhouette where 0 indicates pixels not belonging to the segemnt and 1 indicates pixels belonging to the segment. The structure should also store the length and width of theimage rectangle. |
| 17 | Segment Image | ImStruct | A rectangular image structure that contains the original subimage of the segment silhouette. If the original image is color, then the three color spaces will be stored. The structure should also store the length and width of the image rectangle. An alternative representation is to provide the pointer to the original image and the relative coordinates of the segment silhouette with respect to the original image. |
| 18 | OC coef. file | string | The file name of the object classification coefficient file, which stroes all the paremters and classifier coefficients. The content of his file will be read in during initialization and saved in memory. Details of this file is shown in another section. |

*FIG. 2B*

| NO. | REFERENCE NAME | TYPE | DEFINITION |
|---|---|---|---|
| 1 | Camera ID | int | The camera identification tag which the segmented object is obtained. |
| 2 | Frame ID | int | The frame number or time refernce which the segment is obtained |
| 3 | Segment ID | int | The segment identification tag of the segment in the image frame. |
| 4 | Track ID | int | The track identification tag which the segment belongs to. |
| 5 | Class Index | int | The class index of the object. |
| 6 | Class Label | string | The corresponding class label of the object |
| 7 | Confidence | float | Normalized condifence of the classification result (range from 0.1 to 1.0) |
| 8 | Dominant Color | string | The dominant color of the object If it is classified as a vehicle. The string will be "NA" if the object is not a vehicle. |

*FIG. 3*

| ITEM # | REFERENCE | TYPE | DEFINITION |
|---|---|---|---|
| 1 | numFeat | int | Number of features used in the classifier |
| 2 | featIdx | int[numFeat] | numFeat indices of the feature vector. The indices point to the features used in the classifiers. |
| 3 | numCls | int | Number of object classes |
| 4 | classLabel | string[numcCs] | numCls class labels, Each class label is a string of characters. |
| 5 | numHidT | int | number of hidden units in the hidden layer of RBF$_T$ |
| 6 | hidCenterT | float[numFeat][numHidT] | numFeat by numHidT float matrix of centers for the hidden layer of RBF$_T$ |
| 7 | hidWidthT | float[numHidT] | numHidT float of widths for the hidden layer of RBF$_T$ |
| 8 | numOutT | int | number of outputs in RBF$_T$ |
| 9 | outWeight | float[numHidT+1][numOutT] | numHidT by numOutT float matrix of weights for the output layer of RBF$_T$ |
| 10 | thresholdT | float[numOutT] | numnumOutT float specifying the thresholds for the outputs of RBF$_T$ |
| 11 | numClus | int | number of clusters in the nearest neighbor classifier |
| | for i = 1 to numClus | | |
| 12 | clusCentr$_i$ | float[numFeat] | numFeat float array specifying the centroid of the ith cluster for the nearest neighbor classifier |
| 13 | maxDist | float | maximum distance from the cluster center beyond which the sample will be classified as others |

*FIG. 10A*

| ITEM # | REFERENCE | TYPE | DEFINITION |
|---|---|---|---|
| 14 | assignToRBF | int | The index of the third level RBF which the cluster is assigned. |
| | end for | | |
| 15 | numRBF | int | Number of RBF classifiers in the third level. |
| | for i = 1 to numRBF | | |
| 16 | numHid | int | number of hidden units in the hidden layer of RBF T |
| 17 | $hidCenter_i$ | float[numFeat][numHid$_i$] | numFeat by numHidT float matrix specifying the centers for the hidden layer of RBF$_i$ |
| 18 | $hidWidth_i$ | float[numHid$_i$] | numHid$_i$ float specifying the widths for the hidden layer of RBF$_i$ |
| 19 | outWeight | float[numHid$_i$ +1][numCls] | numHid$_i$ by numCls float matrix specifying the weights for the output layer of RBF$_i$ |
| 20 | $threshold_i$ | float[numCls] | numCls float specifying the thresholds for the outputs of object classes of RBF$_i$ |
| | end for | | |
| 21 | numColor | int | number of colors in the palette |
| 22 | ColorLabel | string[numColor] | numColor of strings. Each string specifies the label of one color. |
| 23 | minSaturation | float | The saturation values below which the color is determined by the luminous value |
| 24 | numLum | int | number of luminous level |

*FIG. 10B*

| ITEM # | REFERENCE | TYPE | DEFINITION |
|---|---|---|---|
| 25 | lumLevels | float[numLum] | numLum floats specifying the boundary of the luminous levels |
| 26 | lumColorIdx | int[numLum] | the color indices for the various luminous levels. |
| 27 | numHueSector | int | number of hue sectors |
| 28 | hueSector | float [numHueSector] | The boundaries of the hue sectors in radian. Programmer be careful when a sector cross over 2*pi. |
| | for i = 1 to numHueSector | | |
| 29 | numSat $_i$ | int | number of saturation levels in the hue sector $i$ |
| 30 | satLevel $_i$ | float[numSat1]$_i$ | saturation boundaries for the different colors in the hue sector $i$. Assume that the initial bondary is the minSaturation and the outermost boundary is the maximum saturation. This assumption requires only numSat$_i$-1 boundaries. |
| 31 | hueColorLabel$_i$ | int[numSat$_i$] | The color indices of the various saturation levels in the hue sector $i$ |
| | end for | | |
| 32 | m_seq | int | Number of consistent basic classifier resutls of the sequential classifeir |
| 33 | n_seq | int | Number of total basic classifier results of the sequential classifier |

*FIG. 10C*

OBJECT CLASSIFICATION IN VIDEO IMAGES

BACKGROUND

Advanced video surveillance systems typically perform many basic analytic functions, such as time recording, motion detection and motion tracking. More advanced features for video surveillance and monitoring are also in high demand. One such function is classifying object that are detected and tracked. Having an accurate object classification function enables users to define more specific events of interest, such as a moving red car, and consequently provides more video storage space, without storing more broadly defined events, such as-motion only. Current object classification methods are not robust and do not offer any flexibility.

SUMMARY

A combination of inter-frame and intra-frame and sequential classification methods provide for robust and flexible object classification. Intra-frame classification determines the object type based on features extracted from a single image. Inter-frame classification determines object types based on the features extracted from several sequential frames. A sequential classification combines the results of the inter- and intra-frame classifications over a sequence of images.

BRIEF DESCRIPTION OF THE DRAWINGS

FIGS. 2A and 2B are a table illustrating inputs for object classification according to an example embodiment.

FIG. 3 is a table illustrating outputs of an object classification module according to an example embodiment.

FIGS. 10A, 10B, and 10C are a table illustrating items, formats and definitions in an object classification coefficient file according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

A method of classifying objects in an image utilizes a combination of intra frame classification and inter frame classification. In one embodiment, an object classification module in conjunction with video motion detecting and tracking modules running on a computer is used to classify the objects.

Figure 1:
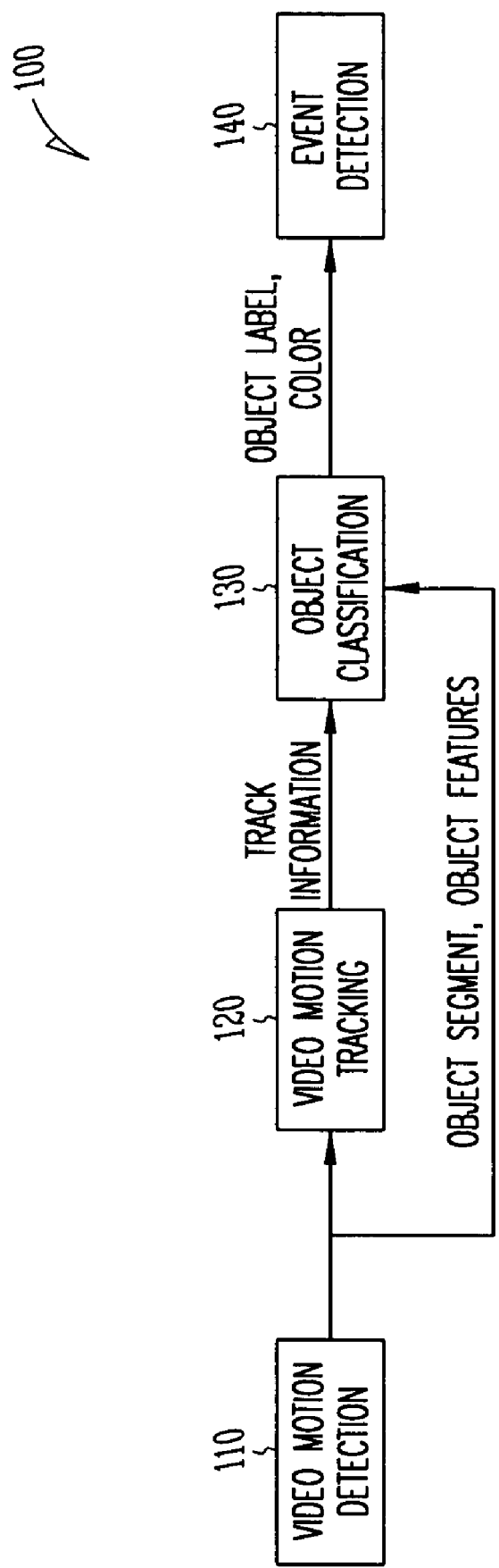
FIG. 1 is a block flow diagram illustrating modules in a system for an event detection system according to an example embodiment.

In FIG. 1, modules used to implement an event detection system are shown generally at 100. A Video Motion Detection (VMD) module 110 detects motion and provides a moving blob segment and its features. Alternatively, a Video Motion Tracking (VMT) module 120 may provide a more accurate blob segment and feature values. In addition, VMT module 120 provides tracking information for object classification. Outputs of an Object Classification (OC) module 130, which are passed onto an Event Detection module 140, include the object label and, if required, the color of the object.

The Object Classification (OC) module 130 functions to classify an input object, which is a detected moving object, into one of three classes, for example {human, vehicle, others}, and optionally subclasses, for example {cars, vans, sport utility vehicles, and trucks}, provided that the input object exceeds a specified pixel size. OC module 130 may also function to determine the dominant color of that object, such as when the object is classified as a vehicle.

The table in FIGS. 2A and 2B at 200 list example inputs for the object classification module 130. A name 210, type 220, and definition 230 of each input are tabulated. Three groups of inputs are listed: the references to the segmented object, the feature vector, and the segment images. The references to the segmented object establish a unique ID for the object to be classified. The information will also be used in inter-frame classification. The feature vector contains a set of features that are discriminatory characteristics for each class of the objects. The segment images are used to compute the dominant color in case the object is classified as a vehicle. In FIGS. 2A and 2B, the features are stored in a floating point array. The indices of the features do not need to be sequential as long as the features have fixed locations in the feature vector and are known.

In one embodiment, the bounding box (MBR) of the segmented object is selected based on the one whose axes are parallel to the principal and minor axes of the detected object. This provides a more meaningful length, width and length/width ratio of the object. This MBR requires more computations and is not absolutely required. In a further embodiment, the MBR whose axes are parallel to the x and y directions may be selected.

Outputs of the Object Classifier module 130 are listed in a table at 300 in FIG. 3. Note that the first four output elements, camera id 310, frame id 320, segment id 330 and track id 340 are redundant in that they are direct feedback from the inputs. The class indices 345 and the class labels 350, and dominant colors 355 are specified in an "OC coef. file". When the object classification did not make a classification decision on the input object (this happens when a sequential classifier is invoked), then the class index, the class label, and the dominant color will be −1, "No Decision" and "No Color" respectively.

Figure 4:
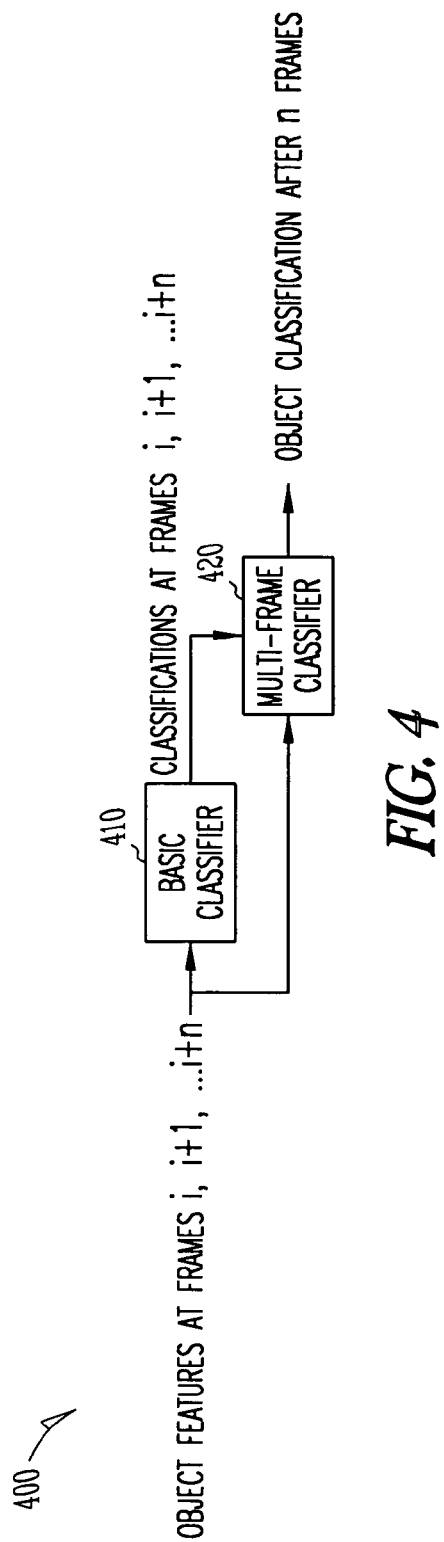
FIG. 4 is a block flow diagram illustrating three stage object classification according to an example embodiment.

The object classification approach is shown in FIG. 4 at 400. Two classifiers together make the object classification. A basic classifier 410 classifies the input object based on the features extracted from one image frame. It is also referred to as an intra-frame classifier. A multi-frame classifier 420, also referred to as an inter-frame classifier, combines the results from multiple basic intra-frame classifications to determine the final object classification. Note that perspectives of objects may change from frame to frame. Vehicle changes can be quite dramatic as a view of the object changes from a side view to a front view. Perspective and aspect may become an additional feature for the multi-frame classifier.

In one embodiment the inter-frame classifier uses sequential frames from a video of an area. The term sequential means that images have some successive temporal relationship. In other words, consecutive frames of a video may be used. In further embodiments, the frames of video may be sampled, or every nth frame may be used. In still further embodiments, images may be taken of the area at desired intervals, and used as the sequential images or frames.

Figure 5:
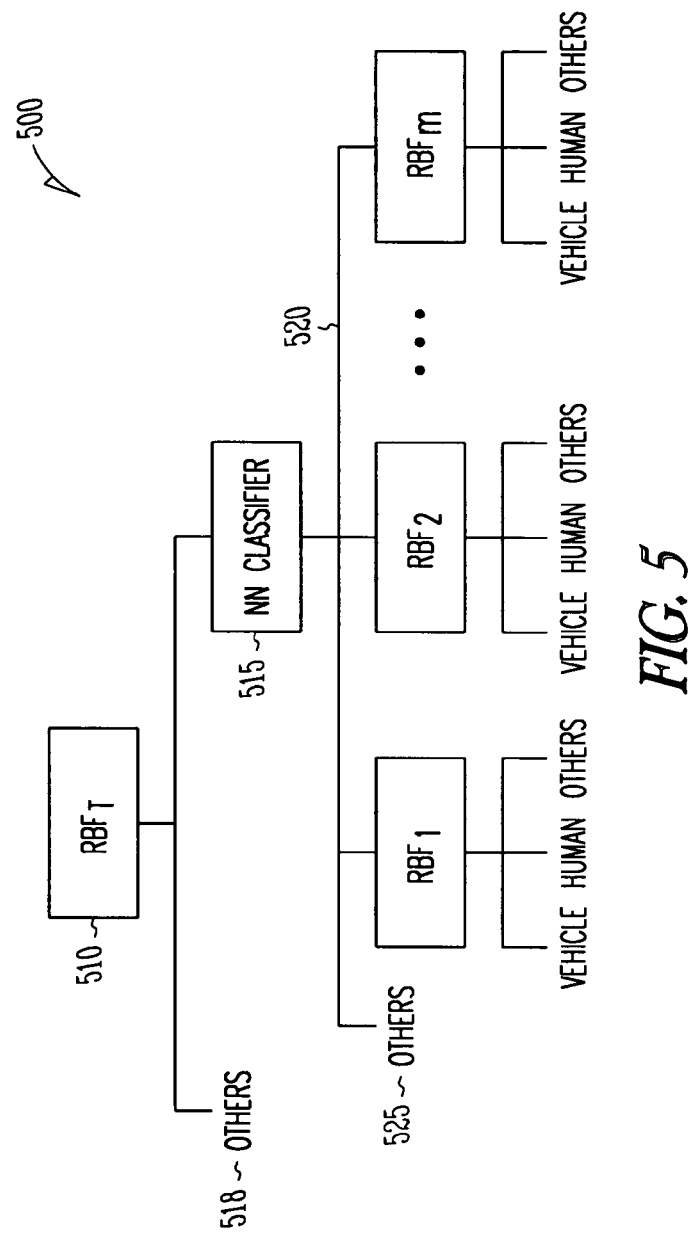
FIG. 5 is a block flow diagram illustrating a basic classifier for feature based object classification according to an example embodiment.

The basic classifier 410, which in one embodiment is a hierarchy of classifiers, is shown at 500 in FIG. 5. A top level of the hierarchy is a Radial Basis Function Neural Net (RBF) classifier 510, referred to as $RBF_T 510$. $RBF_T 510$ defines the boundary of the vehicle and human training samples. If the input features fall within the $RBF_T 510$ boundary, then a Cluster Base classifier (CBC) 515 in a second level will be invoked. If not, the sample will be classified as "others" at 518. Hierarchical classification techniques may be applied to the inter-and intra-frame classification methods. A hierarchical classification technique allows an object to be classified as unknown when the features of an object do not fit well to trained data. The hierarchical classification technique applies a divide and conquer strategy to determine object type.

The cluster based classifier 515 consists of a set of clusters, each of which is represented by a center, a maximum distance from the cluster center, $dmax_i$, and an assignment to a third level RFB classifier 520. When CBC 515 is invoked, the cluster, say m, nearest to the input sample is determined by finding the minimum distance among the cluster centers and the sample. If the minimum distance exceeds $dmax_m$, then the sample will be classified as "others" 525. Else the CBC determines which one of multiple third level classifiers 520 will fire based on the third level RFB classifier assignment for the nearest neighbor cluster.

To avoid having to change software when a new class is added, the classification process is parameterized into a file. Parameters may include the number of classes, organization into a hierarchical structure and coefficients and thresholds.

Figure 6:
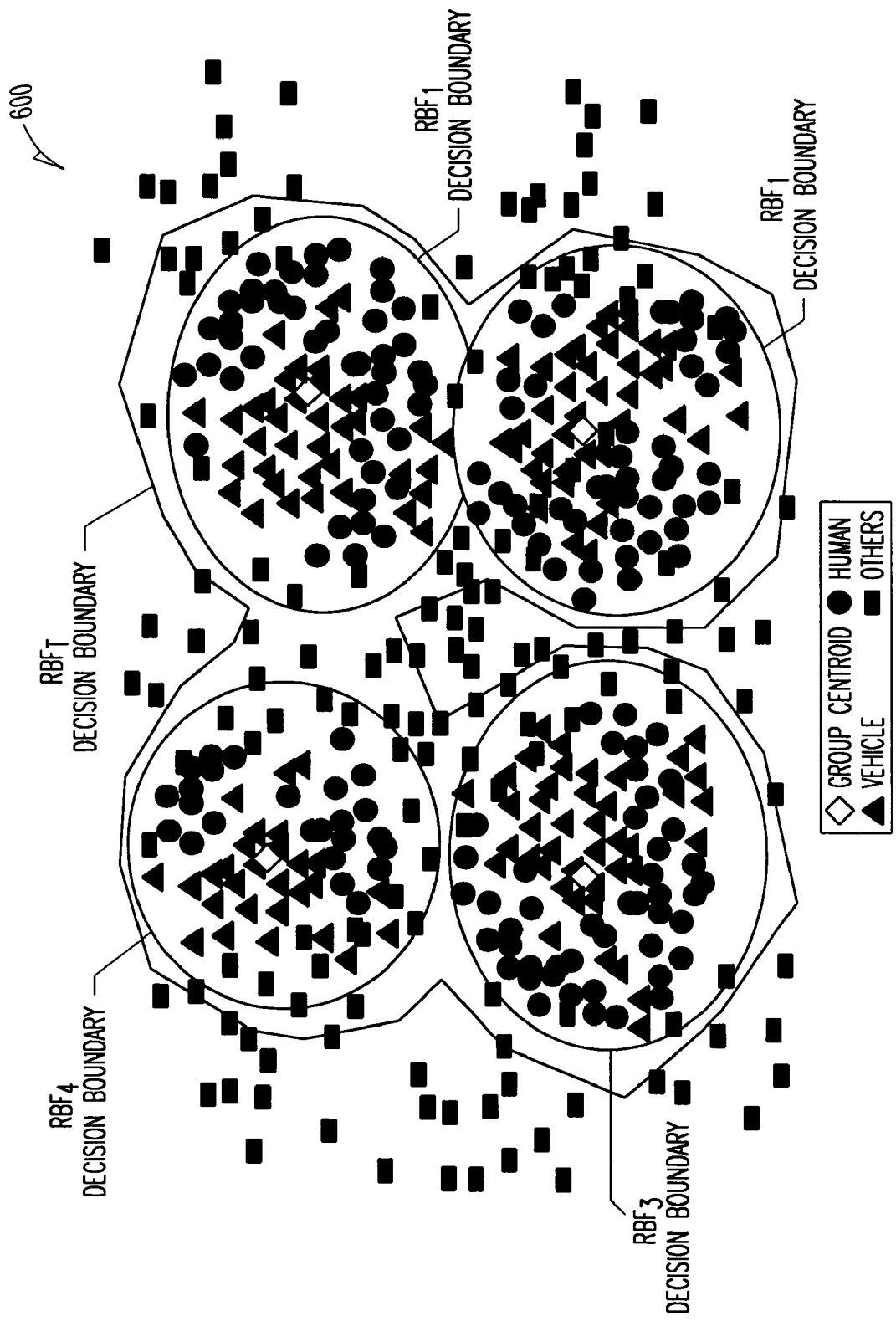
FIG. 6 is a diagram of objects illustrating a hierarchy of decision boundaries for object classification according to an example embodiment.

The third and last level of the hierarchy is a set of RBF classifiers 520, each of which classifies the input features within its own subspace. FIG. 6 pictorially illustrates the classification hierarchy in a 2-feature space generally at 600.

Each RBF neural net classifier may have one hidden layer. The boundaries of each classifier is formed to include objects of interest, such as vehicles and humans, while excluding objects that are classified as other. Thus, the boundaries are closed, and empty spaces in the feature space are classified as other, or unknown. The resulting classifier will not be too generalized, making the object identification process more robust and accurate. In one embodiment, during training of the classifiers, samples may be artificially created around the boundary space of interest to more precisely define the closed boundary of each classifier.

In one embodiment, the multi-frame classifier 420 has two classification processes: the inter-frame classifier and the sequential classifier. The inter-frame classifier is also a feature-based RBF classifier. The inter-frame features, which may be the recurrent motion image features, are constructed from a sequence of a tracked object.

The sequential classifier is a confidence building classifier that the same object should be classified as the same class in m of n successive frames. Other more sophisticated sequential approach is a multi-hypothesis method. Values of m and n, which are also stored in the OC coefficient file, are subjected to change depending on expected number of frames the object be observed in the ROI. The sequential classifier can be decommissioned by setting both m and n to 1.

The sequential classifier may be used to cumulate confidence and consistence in the object classification scheme. In one embodiment, the sequential classifier is used to classify a same tracked object. The tracked object may be observed in multiple aspects, and may have slightly different features in each frame as calculated by the object classification module multiple times. This results in a sequence of object classes. The sequential classifier looks at this sequence of classified results and determines the object class based on the consistency of occurrences in each object class. Changes in perspective may also be used to confirm the classification of an object. Other features that are expected to change from frame to frame may also be used as a new feature for sequential classification. In one embodiment, sequential frames are taken from common video sources. In further embodiments, a variable number of frames per second, or even less than one frame per second may be used to perform object classification.

Figure 7:
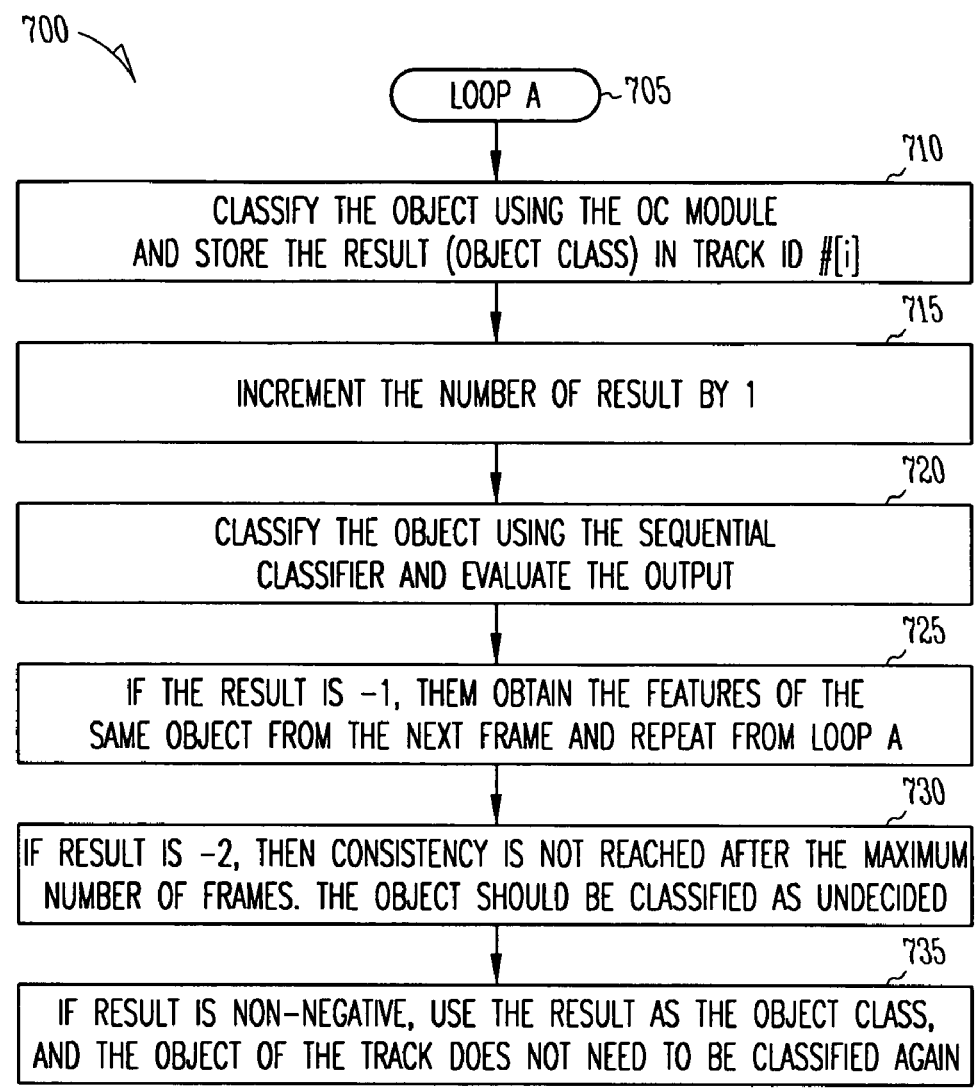
FIG. 7 is a pseudo code representation of object classification according to an example embodiment.

Each valid track may have a track id and object ID associated with the track that consists of the same object in multiple frames. Pseudo code for implementing a process of classifying an object based on multiple frames is illustrated in FIG. 7 at 700. At 705, a loop A is created. At 710, the object is classified using the OC module and store the result (object class) in Track ID #[i]. At 715 the number of result is incremented by 1. Next, the object is classified at 720 using the sequential classifier and evaluate the output. At 725, if the result is−1, then obtain the features of the same object from the next frame and repeat from loop A. At 730, if the result is−2, then consistency is not reached after the maximum number of frames. The object should be classified as undecided. At 735, if the result is non-negative, use the result as the object class, and the object of the track does not need to be classified again.

Figure 8:
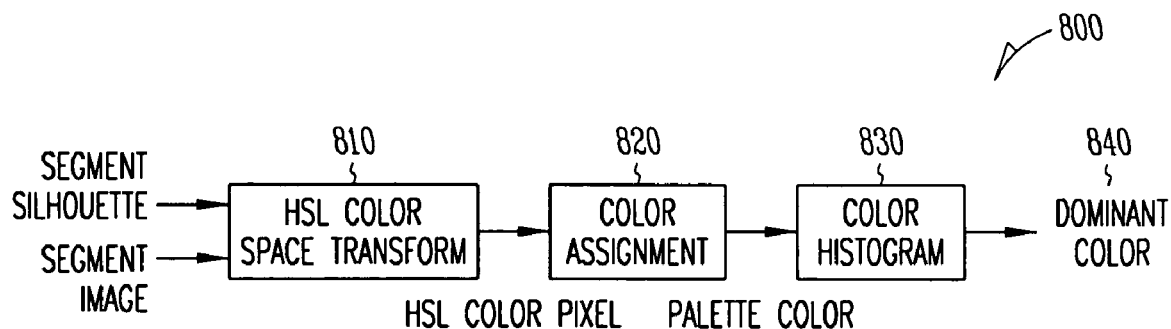
FIG. 8 is a block flow diagram illustrating dominant color computation according to an example embodiment.

The dominant color of a vehicle is computed in three steps as shown at 800 in FIG. 8. A first step 810 transforms the color space of the segmented object pixels to the HSL color space. A second 820 steps quantized the colors into a specific set of colors. The last step 830 builds a histogram of the colors and determines the dominant color 840 as the maximum of the histogram.

Transforming the other color space, e.g. RGB, into HSL (hue, saturation, and luminous) provides an easier palette color assignment. Only the pixels that belong to the segmented object need transformation. That is if the pixel value in the segment silhouette is 1, then the corresponding pixel in the segment image will be transformed. The transformation is:

Luminous=$R+G+B$;

Saturation=$1-(3*\min(R,G,B)/(R+G+B))$

Hue=$\cos^{-1}\{0.5*[(R-G)+(R-B)]/\sqrt{((R-G)^2+(R-B)*(G-B))}\}$

If $B>G$, then hue=$2*pi$−hue.

Figure 9:
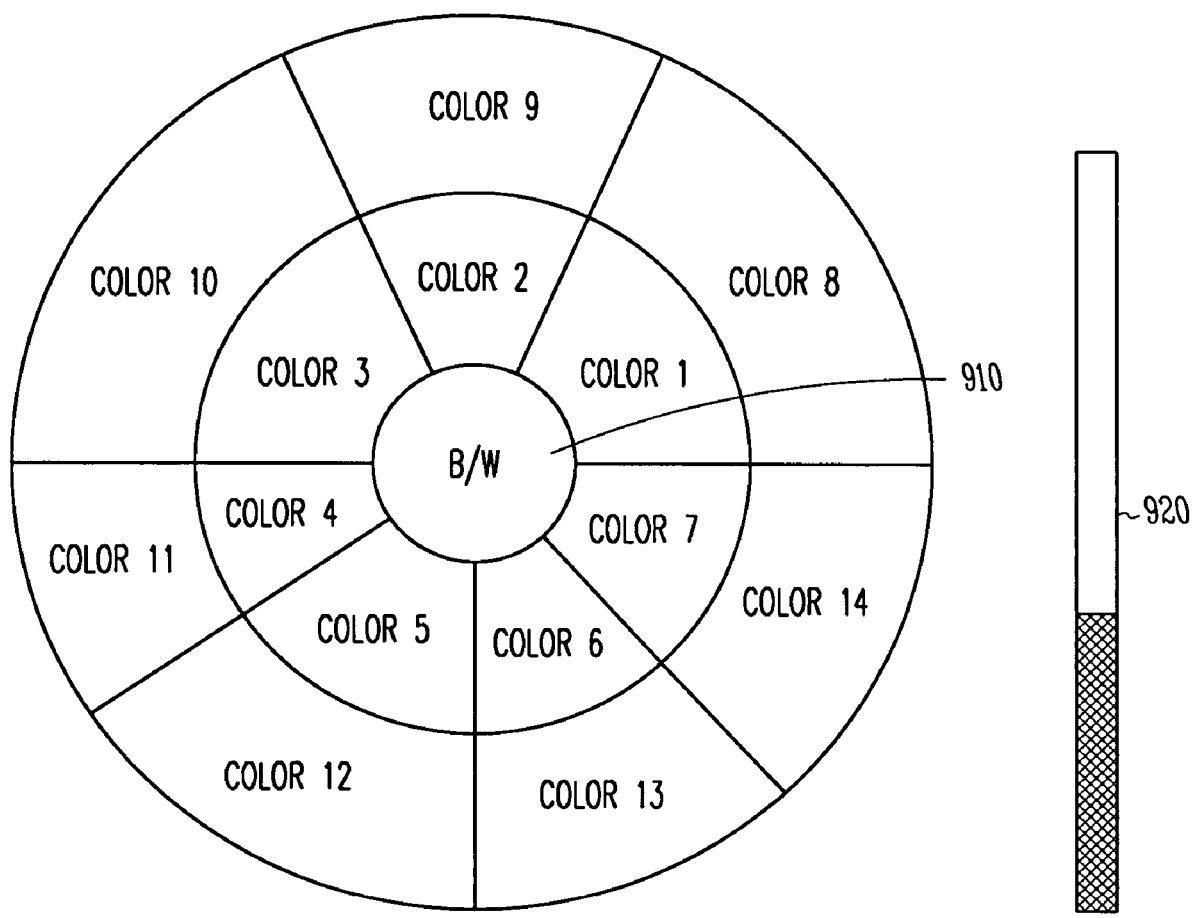
FIG. 9 is a diagram illustrating palette color assignment for an object according to an example embodiment.

Each of the color-transformed pixels is then assigned to a color on the palette, whose partitions in the HSL color space are coded in the OC coef file. The palette partition in the HSL space is shown in FIG. 9 at 900. When saturation is below a threshold 910 (the innermost circle of the hue-saturation diagram), the color will be assigned to either black or white depending on the luminous value 920. That is: if the saturation is within the lowest saturation range and has low luminous, then the color is black. If the saturation is within the lowest saturation range and has high luminous, then the color is white. The luminous range may be further divided into more ranges and more colors may be created, such as gray, and silver. The hue, which corresponds to the wavelength of the color spectrum, is quantized into color sectors, such as red, yellow, green, blue, etc. Multiple levels of saturation within each color sector partition the color assignment into finer distinction, such as light red, dark red, etc. The number of colors in the palette does not need to be the same as the number of partitions. Multiple partitions can be assigned to be the same color.

The object classification coefficient file stores the parameters for the basic classifier, which includes the various RBF neural net classifiers and the nearest neighbor classifier, the sequential classifier and the dominant color palette. The parameter values are saved in binary representation. FIGS. 10A, 10B and 10C illustrate a table 1000 of items, formats and their definitions in the file.

A string in this specification is a set of characters without space. If multiple words, such as "light red", are used to label a color or an object, the corresponding string should link the multiple words with underscore, e.g. light-red. Then the software will break the string into multiple words which can be shown to user.

Figure 11:
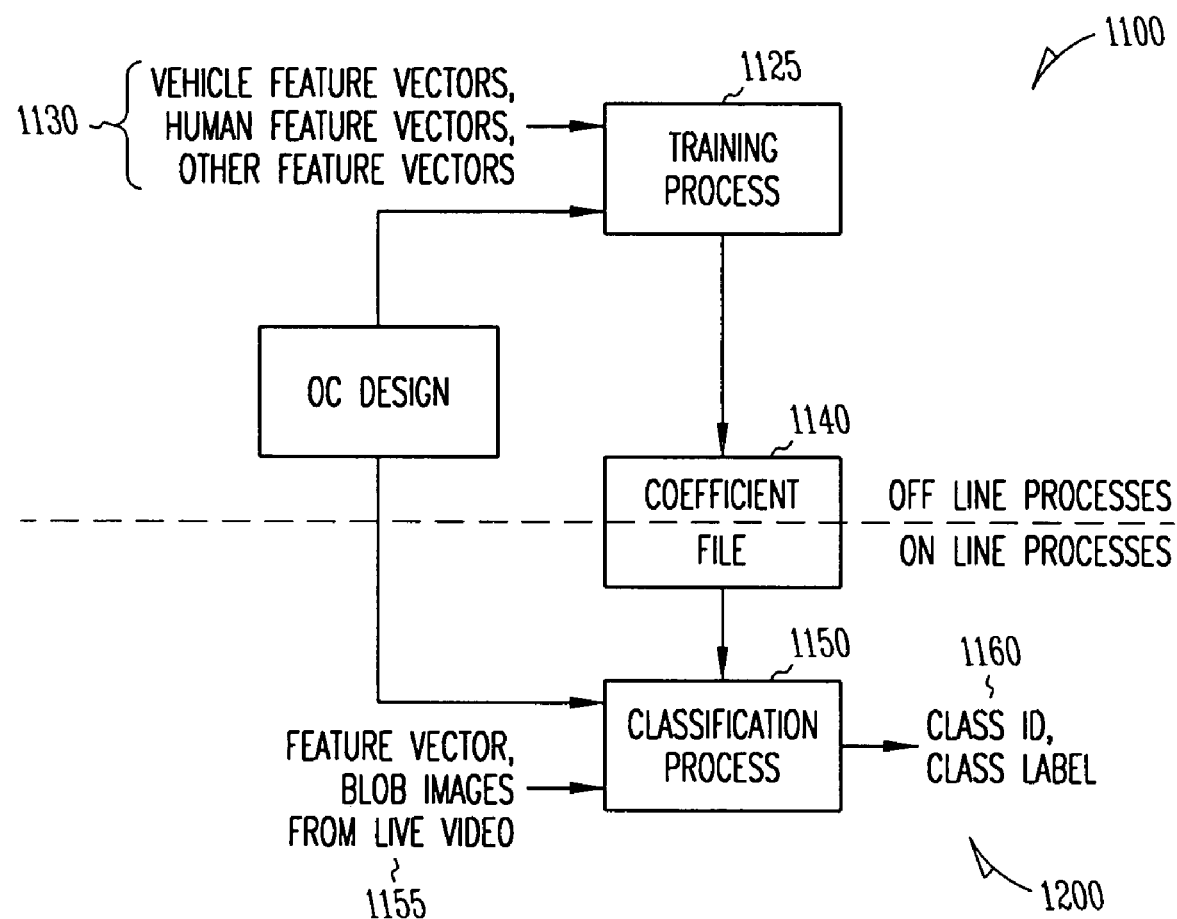
FIG. 11 is a block flow diagram illustrating object classification training and classification processes according to an example embodiment.

An object classification development process is illustrated at 1100 in FIG. 11. There are two processes, an offline training process at 1110 and classification at 1120, which is an on-line process.

The training process uses a training process module 1125. It learns feature characteristics of objects of interest from a set of training sample features 1130. In this example, the objects of interest are a vehicle, human and others. The training process uses discriminatory features of vehicles, human and others that are extracted from final VMD, VMT modules. If the VMD and VMT are changed and produce different feature characteristics, the previous training may be nullified. The training process generates a binary file 1140 for the classification process 1150.

The binary file 1140, which consists of coefficients and parameters is used by the classification process 1150 to classify objects 1155 from all video sequences. There is no need to change it until objects of different characteristics are required to be classified. Then, the training process is applied to the new feature characteristics and generates a replacement for the binary coefficient file.

The classification process 1150 loads and uses the binary coefficient file 1140 during initialization and object classification respectively, and is the on-line process used to determine the case of the input object. The outputs of the classification process are the class ID, class label and a classification confidence of the object at 1160.

In one embodiment, the training process can be coded in matLab and does not need to convert to C++. On the contrary, the classification process may be coded in both matLab and C++. The matLab version may be used for prototype and verification purposes. The C++version may be embedded in and image classification process.

Figure 12:
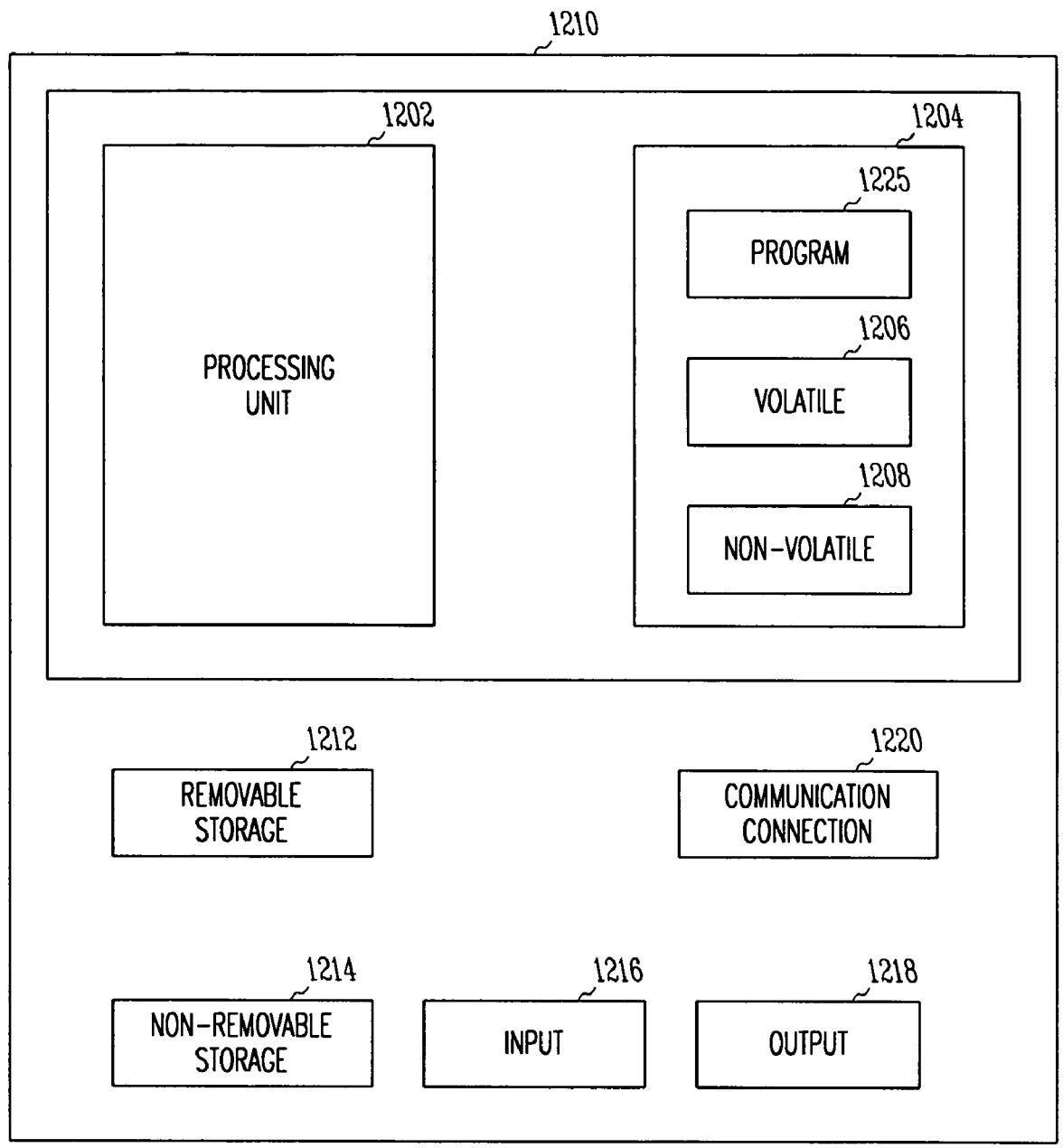
FIG. 12 is a block diagram of an example computer system capable of performing some or all of the methods and processes described herein.

A block diagram of a computer system that executes programming for performing the above algorithms is shown in FIG. 12. A general computing device in the form of a computer 1210, may include a processing unit 1202, memory 1204, removable storage 1212, and non-removable storage 1214. Memory 1204 may include volatile memory 1206 and non-volatile memory 1208. Computer 1210 may include—or have access to a computing environment that includes—a variety of computer-readable media, such as volatile memory 1206 and non-volatile memory 1208, removable storage 1212 and non-removable storage 1214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1210 may include or have access to a computing environment that includes input 1216, output 1218, and a communication connection 1220. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1202 of the computer 1210. A hard drive, CD-ROM, and RAM are some examples of articles including a computer-readable medium. For example, a computer program 1225 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 1210 to provide generic access controls in a COM based computer network system having multiple users and servers.

The Abstract is provided to comply with 37 C.F.R. § 1.72 (b) to allow the reader to quickly ascertain the nature and gist of the technical disclosure. The Abstract is submitted with the understanding that it will not be used to interpret or limit the scope or meaning of the claims.

The invention claimed is:

1. A method of classifying objects from image frames, the method comprising:
using a computer to perform the elements of:
applying an intra-frame feature based object classifier to objects within each image frame to identify object classes for objects in the frame;
applying an inter-frame object classifier to persistent objects in sequence of frames to identify object classes for objects in multiple frames; and
applying a sequential classifier to multiple sequential frames to classify an object as a function of the classifications by the feature based object classifiers.

2. The method of claim 1 wherein the sequential classifier classifies an object if it is classified as the same in m of n successive frames.

3. The method of claim 2 wherein m is 2, and n is 3.

4. The method of claim 1 wherein the intra-frame classifier comprises a feature based classifier.

5. The method of claim 4 wherein the inter-frame classifier uses recurrent motion image features.

6. The method of claim 4 wherein the recurrent motion image features are selected from the group consisting of perspective and aspect.

7. The method of claim 1 and further comprising:
identifying objects in an image frame; and
tracking the identified objects in multiple sequential frames.

8. The method of claim 1 wherein objects are classified as person, vehicle or other.

9. The method of claim 8 and further comprising determining a dominant color of an object classified as a vehicle.

10. The method of claim 9 wherein determining a dominant color comprises:
converting a color space of segmented object pixels to a hue, saturation, and luminous (HSL) format;
assigning each color-transformed pixel a color on a palette; and
determining a dominant color.

11. The method of claim 8 and further comprising sub-classifying vehicles into cars, vans, sport utility vehicles and trucks.

12. The method of claim 1 wherein the feature based object classifier comprises multiple radial basis function neural net classifiers, each defining a boundary of known objects that is closed.

13. A method of classifying objects from image frames, the method comprising:
using a computer to perform the elements of:
applying an intra-frame feature based object classifier to objects in multiple sequential frames to identify object classes for objects in each frame;
an inter-frame feature based classifier that classifies objects as a function of features of the objects in multiple frames; and
applying a sequential classifier to multiple sequential frames to classify an object as a function of the classifications by the feature based object classifiers.

14. The method of claim 13 wherein the sequential classifier classifies an object if it is classified as the same in m of n successive frames.

15. The method of claim 14 wherein m is 2 and n is 3.

16. The method of claim 15 wherein the inter-frame classifier uses recurrent motion image features.

* * * * *